Figure 1:
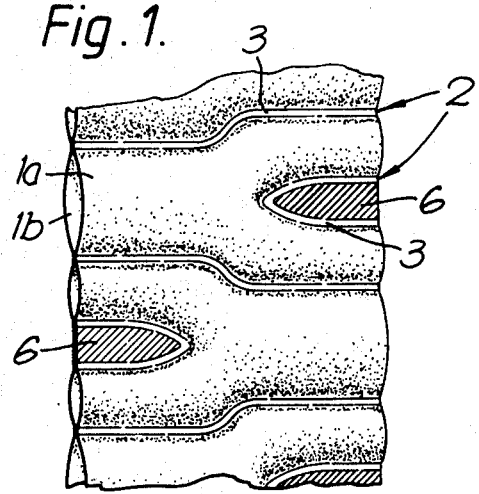

United States Patent [19]  
Changani et al.

[11] 4,342,800  
[45] Aug. 3, 1982

[54] POLYMERIC ARTICLES

[75] Inventors: Pushkumar D. Changani, Swindon; Donald G. Peacock, Kempsford; David Roberts, Broome Manor Swindon, all of England

[73] Assignee: Raychem Corporation, Menlo Park, Calif.

[21] Appl. No.: 172,888

[22] Filed: Jul. 28, 1980

[51] Int. Cl.³ .................. B29C 27/00; B29C 17/04
[52] U.S. Cl. .................. 428/36; 156/86; 156/218; 428/910
[58] Field of Search .................. 156/52, 84, 85, 86, 156/218, 290, 291–294; 428/36, 910

[56] References Cited  
U.S. PATENT DOCUMENTS

| 518,403 | 4/1955 | Goodwin . | |
|---|---|---|---|
| 3,022,543 | 2/1962 | Baird, Jr. et al. . | |
| 3,239,125 | 3/1966 | Sherlock | 228/56 |
| 3,243,211 | 3/1966 | Wetmore | 287/78 |
| 3,253,618 | 5/1966 | Cook | 138/125 |
| 3,253,619 | 5/1966 | Cook et al. | 138/125 |
| 3,305,625 | 2/1967 | Ellis | 174/84 |
| 3,316,343 | 4/1967 | Sherlock | 174/84 |
| 3,382,121 | 5/1968 | Sherlock | 156/165 |
| 3,396,894 | 8/1968 | Ellis | 228/56 |
| 3,448,182 | 6/1969 | Derbyshire | 264/22 |
| 3,451,609 | 6/1969 | Gillett | 228/56 |
| 3,501,565 | 3/1970 | Kalwaites | 264/288 |
| 3,525,799 | 8/1970 | Ellis | 174/84 |
| 3,654,017 | 4/1972 | Ropiequet | 156/251 |
| 3,678,174 | 7/1972 | Ganzhorn | 174/84 R |
| 3,721,749 | 3/1973 | Clabburn | 174/88 R |
| 3,818,123 | 6/1974 | Maltz | 174/88 C |
| 3,872,194 | 3/1975 | Lowry | 264/22 |
| 3,899,807 | 8/1975 | Sovish | 24/255 C |
| 3,948,709 | 4/1976 | Ida | 156/209 |
| 3,949,110 | 4/1976 | Nakajima | 428/36 |
| 3,995,964 | 12/1976 | De Groef | 403/272 |
| 4,085,286 | 4/1978 | Horsma et al. | 156/86 X |
| 4,101,699 | 7/1978 | Stine | 428/36 |
| 4,118,260 | 10/1978 | Boettcher | 156/85 |
| 4,123,047 | 10/1978 | Koht et al. . | |

FOREIGN PATENT DOCUMENTS

| 1154280 | 3/1958 | France . |
|---|---|---|
| 990235 | 4/1965 | United Kingdom . |
| 1010064 | 11/1965 | United Kingdom . |
| 1046367 | 7/1966 | United Kingdom . |
| 1178166 | 1/1970 | United Kingdom . |
| 1223967 | 3/1971 | United Kingdom . |
| 1225463 | 3/1971 | United Kingdom . |
| 1284082 | 8/1972 | United Kingdom . |
| 1286460 | 8/1972 | United Kingdom . |
| 1294665 | 11/1972 | United Kingdom . |
| 1334969 | 10/1973 | United Kingdom . |
| 1342202 | 1/1974 | United Kingdom . |
| 1357549 | 6/1974 | United Kingdom . |
| 1454838 | 11/1976 | United Kingdom . |
| 1545386 | 5/1979 | United Kingdom . |
| 2025157 | 1/1980 | United Kingdom . |
| 2038110 | 7/1980 | United Kingdom . |

Primary Examiner—John E. Kittle  
Attorney, Agent, or Firm—James W. Peterson

[57] ABSTRACT

A process for the production of hollow heat-recoverable articles which comprises deforming a substantially non-cross-linked polymeric material at a temperature below the crystalline melting point or softening point of the material, fusing together parts of the material or a part or parts of the material and at least one other polymeric component to produce the configuration of at least one hollow heat-recoverable article and subsequently cross-linking the substantially non-cross-linked material.

9 Claims, 16 Drawing Figures

POLYMERIC ARTICLES

The present invention concerns hollow heat-recoverable polymeric articles, that is to say, hollow articles the dimensional configuration of which may be made to change by subjecting to heat, and in particular, to a process for the manufacture of such articles.

Hitherto, hollow heat-recoverable articles have generally been produced by forming a polymer into the desired heat stable configuration, simultaneously or subsequently crosslinking the polymer in its heat stable configuration, heating the article to a temperature above the crystalline melting point or softening point of the cross-linked polymer, deforming the article and cooling the article whilst in the deformed state so that the deformed configuration is retained. In use, since the deformed state of the article is heat unstable, application of heat will cause the article to revert or tend to revert to its original heat stable configuration.

When hollow articles are of such configuration that they cannot be produced directly by extrusion, for example electrical boots, udders (a term employed herein in a general sense to cover any hollow heat shrinkable article comprising at least three outlets employed in the termination of electrical cables and also commonly referred to as cable "breakouts") or end-caps (a hollow tubular article having a smoothly tapering sealed end) for electric cables, then hitherto such articles have generally been formed into the desired heat table configuration on an item-by-item basis by molding, e.g. by injection, compression or transfer moulding techniques. Quite apart from the added expense of such techniques, for complicated shapes, e.g. udders, distortion may be necessary to remove the articles from the moulding pin or core requiring that the articles be resiliently deformable. Furthermore, in order to render such articles heat-recoverable, such moulded parts have in general hitherto been heated and deformed into a heat unstable configuration on an item-by-item basis.

It is an object of the present invention to provide a process of producing hollow heat-recoverable articles which obviates or reduces the above-mentioned difficulties.

Accordingly, the present invention provides a process for the production of hollow heat-recoverable articles which comprises deforming a substantially non-cross-linked polymeric material at a temperature below the crystalline melting point or softening point of the material to render the material heat-recoverable, fusing together parts of the material or a part of the material and at least one other polymeric component to produce the configuration of at least one hollow heat-recoverable article and subsequently cross-linking the substantially non-cross-linked polymeric material with the proviso that when the polymeric material is in the form of an extruded tube which has been deformed radially outwardly and parts thereof fused together to produce an article at least one end of which is sealed, then said end is sealed in a direction other than solely perpendicular to the axis of the tube and preferably said end is tapered towards the axis.

By the expression "fusing together" as employed herein is meant a process wherein the materials in the parts to be fused together are caused to flow together, e.g. welding by heat, solvent or ultrasonic or radio frequency energy, preferably with the application of pressure, to form a homogeneous bridge between the parts in the absence of any discernible interface therebetween.

The fusion step may be effected either before or after the deformation step, preferably however after the deformation step.

The process is applicable to both crystalline and non-crystalline polymers, the crystalline melting point or softening point being selected accordingly as the maximum deformation temperature.

By "substantially non-cross-linked" polymeric materials as employed herein is meant not cross-linked to the extent that the material cannot be readily bonded to itself or to another polymeric component by fusing. In general, the level of cross-linking in the polymeric material expressed in terms of gel content (ANSI/ASTM d275-68) is preferably less than 40%, more preferably less than 20%, particularly less than 5%. When cross-linking in accordance with the process, preferably gel contents of at least 40%, e.g. at least 50%, particularly at least 65% are attained.

Of particular interest is a process for the production of a plurality of hollow heat-recoverable articles which comprises deforming a substantially non-cross-linked polymeric material at a temperature below the crystalline melting point or softening point of the material, fusing together parts of the deformed material or a parts of the material and at least one other polymeric component to define a plurality of separable hollow heat-recoverable articles and crosslinking the product before or after separating the hollow heat-recoverable articles with the proviso that when the polymeric material is in the form of an extruded tube which has been deformed radially outwardly and parts thereof fused together to produce an article at least one end of which is sealed, then said end is sealed in a direction other than solely perpendicular to the axis of the tube and preferably said end is tapered towards the axis.

Hollow heat-recoverable articles produced by the process of the invention also form part of the present invention.

One advantage of the articles of the invention is that they are substantially recoverable, e.g. recoverable to at least 50% of their maximum extent, at a temperture below the crystalline melting point or softening point of the polymeric material from which they have been produced, e.g. in the range 60° C. to the crystalline melting point or softening point.

The process is particularly useful in the manufacture of heat-recoverable boots, transitions, udders and end-caps for electrical applications, e.g. electrical cables, the use of such products being extensive and well reported in the literature e.g. Proc. IEE 1970, 117(7), 1365 - 1372. Such products may, for example, be produced in accordance with the process of the invention by welding together at least two super-imposed pre-stretched polymeric webs, or the two super-imposed flaps of a single folded pre-stretched polymeric web or be superimposed sidesof a pre-stretched and flattened polymeric tube. Such materials to be fused together may be disposed in accordance with any of the appropriate joining techniques e.g. to provide a lap joint or a butt joint. The polymeric material may be deformed in any direction which will provide the desired direction of recovery in the final product which, in the case of boots, udders and end-caps, is preferably radially inward shrinkage in relation to the substrate to which they are applied and, more preferably, in the substantial absence of shrinkage longitudinally in relation to said substrate. Such shrinkage may be achieved by mono-axial deformation of the polymeric material.

The process of the present invention also lends itself to the production of such articles having parts thereof of different polymeric composition so that the properties of the article such as flexibility or electrical conductivity can be varied within a single article. For example, one part of an article such as the multiple legs of a cable udder may be produced as a single component by blow moulding, e.g. from an extruded tube of one material, to the desired configuration and another part, e.g. the cable side of the udder, produced in tubular form by extrusion of a different material with subsequent expansion. When blow moulding techniques are employed, it is found that this may provide the necessary degree of deformation to enable heat-recoverability in the final article. The two parts are subsequently fused together in the desired configuration. In such manner, the legs of the udder may, e.g., have semi-conducting electrical characteristics and the cable inlet part insulating characteristics.

In the production of heat-recoverable articles in accordance with the invention, it is not always necessary to deform the whole of the non-cross-linked polymeric starting material. For example, when employing polymeric material in the form of a web, it is possible locally to deform specific areas of the web, for example by pressing or by vacuum forming at an elevated temperature below the crystalline melting point or softening point of the material with subsequent cooling to maintain the deformed condition of the deformed components so formed. Such deformed components may then be fused to other components, for example to a similar component formed in a separate web, to the configuration of the desired product.

Hollow heat recoverable articles produced in accordance with the process of the invention may advantageously be coated internally with an adhesive or sealant, as described and claimed in U.S. Application No. 172,899 (our case reference RK123) filed on even date herewith, elg. an adhesive such as a hot-melt adhesive or a sealent (such as described in UK Pat. No. 1,116,878 the disclosure of which is incorporated hereby reference). The application of the adhesive or sealant may be effected before, during, or after the process of the invention by appropriate choice of adhesive or sealant and process conditions. For example, a hot-melt adhesive or sealant may be applied to the non-cross-linked polymeric material before the fusion step and thereafter the parts to be fused together locally heated and pressed together to locally displace the adhesive or sealane in the regions to be fused together.

Alternatively, the adhesive or sealant may be applied after the fusion step and, where the process involves producing a plurality of separable articles, the adhesive or sealant is preferably applied before separation of the articles.

If self-adhesion of adhesive or sealant-coated contacting parts is a problem, then such parts may be separated by a non-adherable material such as release paper.

Any cross-linkable polymeric material to which the property of dimensional recoverability may be imparted such as those disclosed in UK specification No. 990,235 may be used to form the articles. Polymers which may be used in the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidine fluoride, or other fluorinated polymers or copolymers, e.g. Tefzel (trade name - commercially available from Dupont), elastomeric materials such as those disclosed in UK specification No. 1,010,064 and blends such as those disclosed in UK specification Nos. 1,284,082 and 1,294,665, and compositions such as those disclosed in our co-pending Applications Nos. 15122/77 and 37468/78. The polymeric materials can be tailored to suit the intended use by the addition of fillers, e.g. semiconducting fillers or anti-tracking agents, flame retardants, plasticisers, pigments, stabilisers and lubricants, or where necessary, e.g. where the polymeric material is substantially non-crystalline, a hold-out agent such as a thermoplastic polymer, e.g. polyethylene, may be included in the material.

The polymeric material may be cross-linked by irradiation, for example, by means of an electron beam or by $\gamma$-radiation or it may be chemically cross-linked. Whichever cross-linking process is used, it may be advantageous to incorporate one or more co-curing agents for example polyunsaturated monomers such as triallyl cyanurate, triallyl isocyanurate, diallyl phthalate, ethylene glycol dimethacrylate, trimethylolpropane trimethacrylate, pentaerythritol tetramethacrylate, allyl methacrylate and vinyl methacrylate. One method of chemical cross-linking that may be used in the process according to the invention involves grafting an unsaturated hydrolysable silane on the polymer and subjecting the article to moisture during a curing stage, for example, as described in UK Patent specification Nos. 1,286,460 and 1,357,549.

Any of the techniques conventionally employed for fusing together polymeric materials may be employed in the process of the present invention, e.g. radio frequency, ultrasonic or hot bar welding, and pressure may additionally be applied to ensure a satisfactory bond. Furthermore, it is possible to make use of the fusing operation to separate the articles one from another or from surplus polymeric starting material. For example, it is possible to use a heating/cutting device such as a hot wire cutter or a laser beam, if necessary in association with pressure applying means such as a roller.

If the heat-recoverable article is produced with an undesired protruding external weld seam, then this may be avoided by turning the article inside-out.

As hereinbefore described, the process is particularly appropriate in the production of hollow heat-recoverable articles for use in the elecrical field, e.g. boots, udders and end-caps. In general, such products are characterised by a wall thickness before heat-recovery thereof of at least 0.05 mm preferably from 0.1 to 5 mm, especially from 0.5 to 3 mm e.g. 1 to 3 mm.

Figure 2:
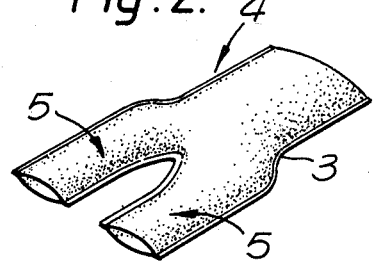
Figure 3:
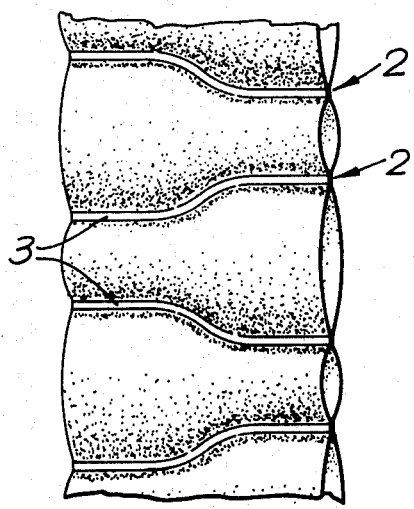
Figure 4:
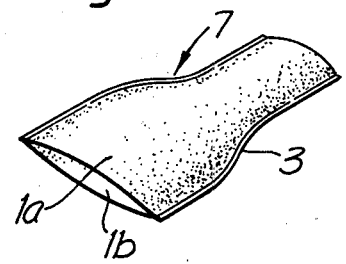
Figure 5:
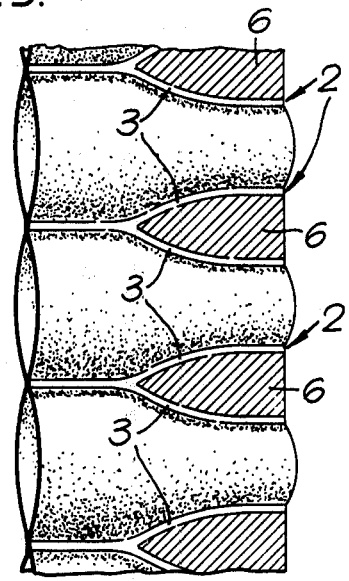
Figure 6:
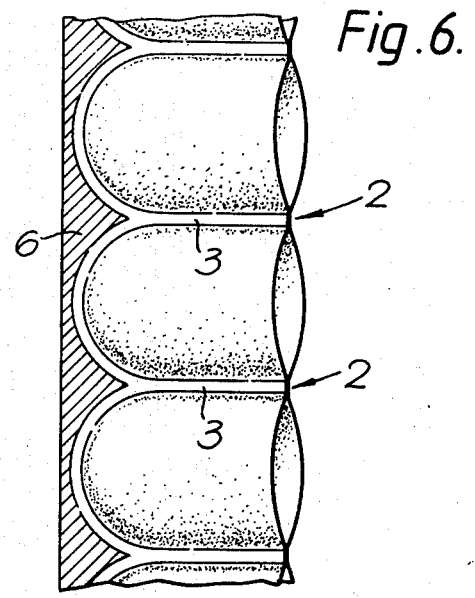
Figure 7:
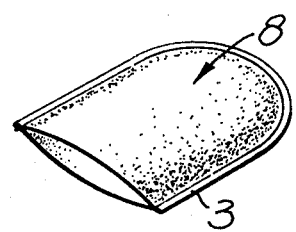
Figure 9:
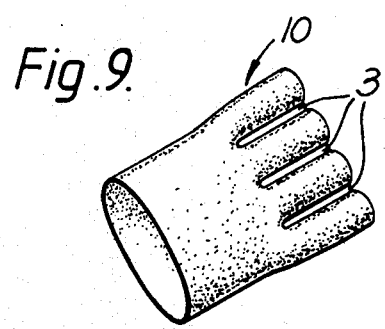
Figure 8:
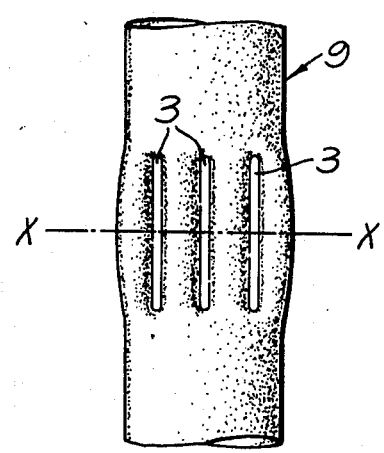
Figure 10:
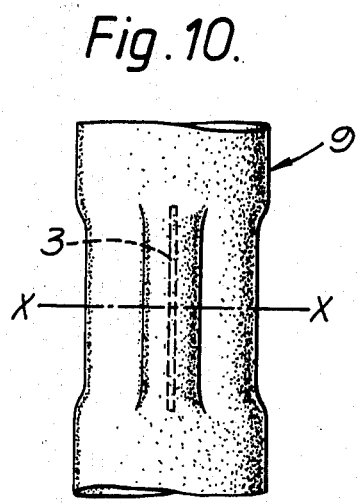
Figure 11:
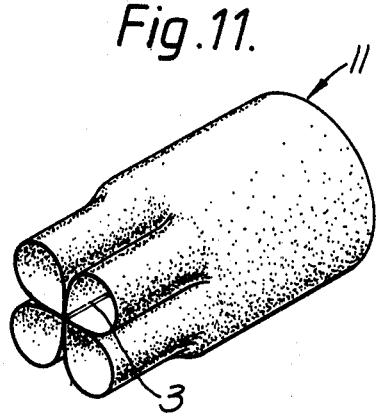
Figure 12:
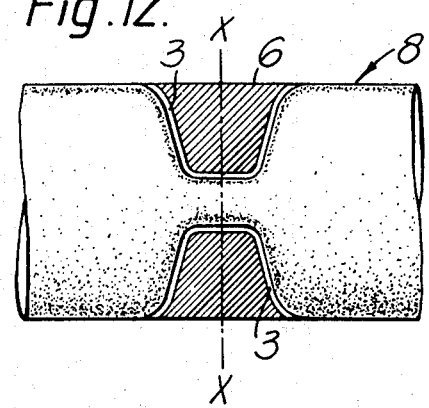
Figure 13:
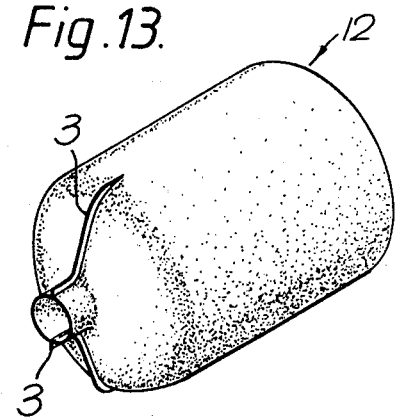
Figure 14:
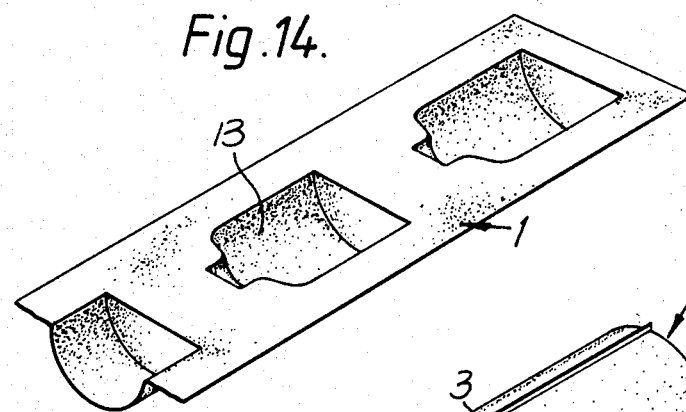
Figure 15:
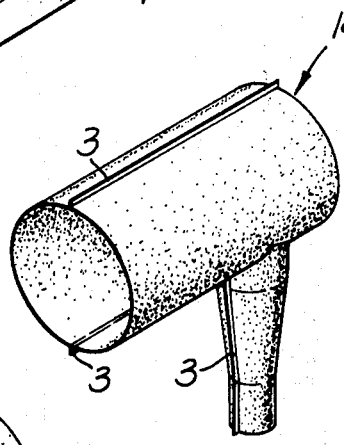
Figure 16:
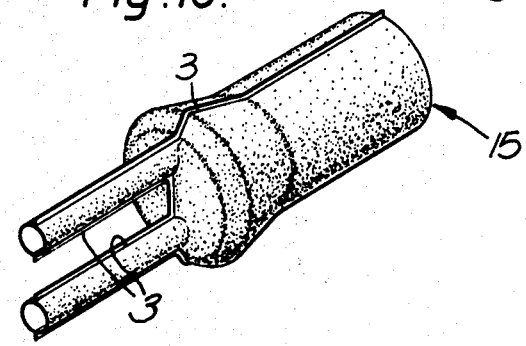

Specific embodiments of the process of the invention will now be described by way of example with specific reference to the accompanying drawings wherein:

FIG. 1 is a schematic top view of an assembly of separable heat-recoverable udders for the termination of an electrical cable, FIG. 2 is a diagrammatic isometric view of an udder produced from the assembly shown in FIG. 1, FIG. 3 is a schematic top view of an assembly of separable heat-recoverable boots employed for sealing an electrical cable at the termination thereof, FIG. 4 is a diagrammatic isometric view of a boot produced from the assembly of FIG. 3, FIG. 5 is a schematic top view of an alternative assembly of separable heat-recoverable boots from which the boot of FIG. 4 may be produced, FIG. 6 is a schematic top view of an assembly of separable heat-recoverable end-caps employed for sealing the ends of electrical cables, FIG. 7 is an isometric view of an end cap produced from the assembly of FIG. 6, FIG 8 is a schematic top view of an assembly of separable heat-recoverable 4-legged udders, FIG. 9 is an isometric view of an udder produced from the assembly of FIG. 8, FIG. 10 is a schematic top view of an alternative assembly of separable heat-recoverable 4-legged udders, FIG. 11 is an isometric view of an udder produced from the assembly of FIG. 10, FIG. 12 is a schematic top view of an assembly of separable heat-recoverable boots, FIG. 13 is an isometric view of a boot produced from the assembly of FIG. 12, FIG. 14 is a schematic isometric view of a polymeric web of material that has been locally deformed to produce boots analogous to that shown in FIG. 13, FIG. 15 is an isometric view of a right angle electrical boot produced in analogous manner to that depicted in FIG. 14 and, FIG. 16 is an isometric view of a 2-legged udder produced in analogous manner to that depicted in FIG. 14.

In the embodiment shown in FIGS. 1 and 2, a pair of polyethylene sheets 1 which have been expanded longitudinally to 3 times their original length at a temperature of 100° C. and cooled whilst in the expanded condition, are superimposed one on the other and welded at positions 2 employing an ultrasonic welding tool to produce welded seams 3. The welded sheets are then irradiated in an electron beam at a dosage of 15 Mrads causing cross-linking of the polyethylene. After cross-linking the assembly is servered along the weld seam 3 employing a mechanical cutter to produce a plurality of heat-recoverable electrical udder 4 each having two legs 5 defined by the welds 3. The area depicted by reference numeral 6 are discarded.

Such udders may be employed in the electrical termination of a cable comprising two primary wires by heat recovering the udder about the end of the cable, the primary wires passing through the legs of the udder.

In a modification (not shown) of the above embodiment the sheets are internally pre-coated with a sealant or adhesive such as a hot-melt adhesive before the welding stage. The sealant or adhesive selected is one that is relatively insensitive to the subsequent radiation treatment. Furthermore, the regions of the sheet to be welded together are locally pre-heated an pressed together by suitably located heated rollers engageable with the sheets causing the sealant or adhesive in the region to be welded to flow and be displaced immediately prior to the welding stage. The resulting product is thereafter treated in analogous manner to that described above.

In analogous manner to that described in relation to the first embodiment the transitions and end-cups shown in FIGS. 3, 4 and 5 FIGS. 6 and 7 respectively are produced, hereinafter the same reference numerals being employed for analogous parts.

In the embodiment illustrated in FIGS. 8, 9, 10 and 11, two methods of producing 4-legged udders are depicted employing non-cross-linked polyethylene tubing 9 which has been radially expanded to three times its original diameter at a temperature of 100° C. and cooled in the expanded condition. In the embodiment shown in FIGS. 8 and 9, the tubing is welded axially thereof to produce welded seams 3 which define the four legs of each udder, i.e. in a planar configuration, the tubing thereafter being irradiated with an electron beam as hereinbefore described and thereafter servered transversely thereof along the lines X—X.

In the embodiment shown in FIGS. 10 and 11 the tubing is welded axially thereof so as to produce welded seam 3 which define each udder in a cruciform configuration as shown in FIG. 11.

In the embodiment shown in FIGS. 12 and 13, electrical boots 11 are produced from non-cross-linked radially expanded polyethylene tubing (produced as described in the preceding embodiment), the boots being profiled by welding to produce welded seams 3 and serving along the weld seams 3 to separate the boots from the superfluous regions 6. The profiled tube is then subjected to electron irradiation as hereinbefore described and subsequently severed transversely along lines X—X to produce the individual boots as shown in FIG. 11.

In the embodiment shown in FIG. 14, an alternative method of producing the boots of FIG. 11 is illustrated. In this embodiment a sheet of non-cross-linked non-expanded polyethylene 1 is heated to a temperature of 100° C. and passed over a series of vacuum moulds. After application of vacuum, the sheet is impressed with a plurality of expanded areas 13 corresponding in shape to one half of the boot to be produced. After cooling, the sheet is removed from the mould and superimposed on a similarly processed sheet of complimentary form such that the half-boots of one sheet are in register with the half-boots of the other. Each complimentary and registerin pair of half-boots are thereafter welded together and the whole boots so formed are separated from the surrounding area by servering along the welds 3 and also across the ends to produce the transitions in their final form as illustrated in FIG. 11. The article so formed are thereafter irradiated in an electron beam as hereinbefore described.

By employing appropriate vacuum moulds, the electrical boots of FIG. 15 and the two legged udders of FIG. 16 are produced.

In each of the preceding embodiments, the wall thickness of the polyethylene after deformation may be 0.05 mm, 0.1 mm, 0.5 mm, 1.0 mm, 1.5 mm, 2.0 mm, 2.5 mm, 3.0 mm, 3.5 mm, 4.0 mm, 4.5 mm and 5.0 mm with similar results.

We claim:

1. A process for the production of a hollow heat-recoverable article, the steps comprising:
    deforming a substantially non-cross-linked polymeric material at a temperature below the crystalline melting point or softening point of the material to render the material heat-recoverable primarily in one direction;
    fusing together parts of the material to one other substantially non-cross-linked polymeric component to produce a hollow heat-recoverable article having a radial axis and a longitudinal axis, said article being heat-recoverable substantially only in a radial sense; and,
    cross-linking the fused portions of the polymetic material.

2. A process as in claim 1 wherein the non-cross-linked material that is deformed has a thickness of at least 0.1 mm.

3. A process as in claim 1 wherein the fusing step defines a plurality of separable hollow heat-recoverable articles.

4. A process as in claim 1 wherein the non-cross-linked polymeric material is in the form of a radially expanded polymeric tube which is fused to itself to produce the configuration of the desired article.

5. A process according to claim 1 wherein the non-cross-linked polymeric material is in the form of a longitudinally expanded polymeric web which is fused to a superimposed analogous web to produce the configuration of the desired article.

6. A process according to claim 1 wherein the non-cross-linked polymeric material is in the form of a non-expanded polymeric web which is locally deformed in at least one region thereof, said deformed region being fused to a deformed region of an analogous web to pruduce the configuration of the desired article.

7. A process according to claim 6 wherein said web is locally deformed by vacuum forming.

8. A process according to claim 1 wherein the resulting article is shaped and non-planer.

9. A hollow heat-recoverable article produced by the process as defined in claim 1.

* * * * *